Dec. 13, 1966  W. BECK ET AL  3,290,939
LIQUID-LEVEL GAUGE
Filed March 5, 1965  2 Sheets-Sheet 1
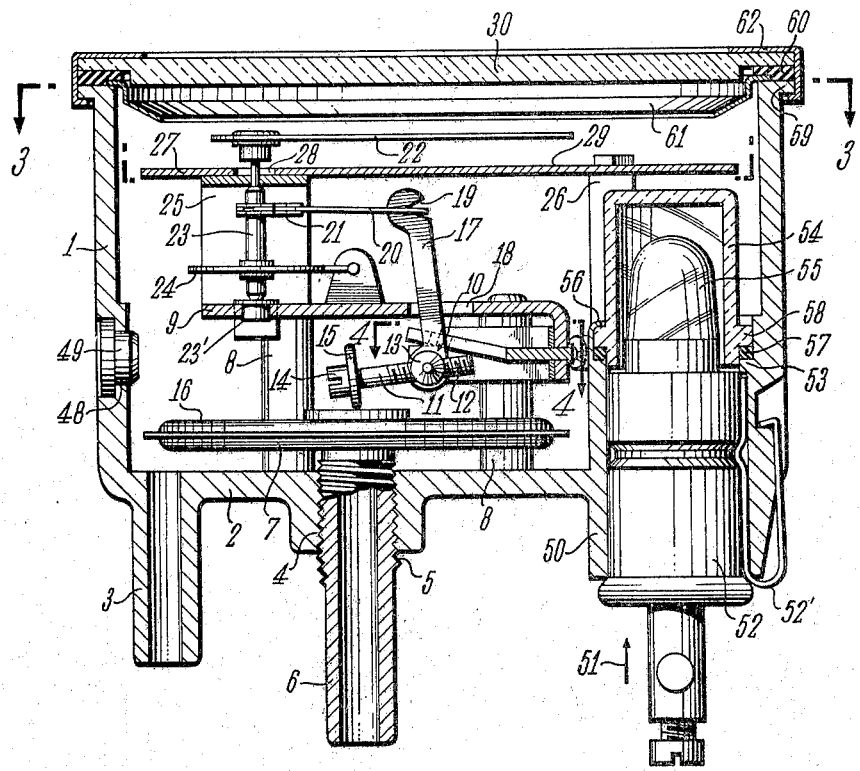
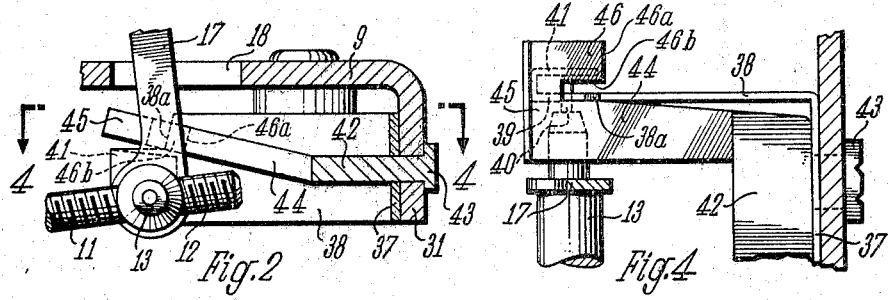
INVENTORS:
Walter Beck
Karl Roll
BY  Ross & Mestern United States Patent Office 3,290,939
Patented Dec. 13, 1966

3,290,939
LIQUID-LEVEL GAUGE
Walter Beck, Stuttgart-Mohringen, and Karl Roll, Leinfelden, near Stuttgart, Germany, assignors to Walter Beck K.G., Stuttgart-Mohringen, Germany, a firm of Germany
Filed Mar. 5, 1965, Ser. No. 437,392
Claims priority, application Germany, July 24, 1964, B 58,402, B 77,827
12 Claims. (Cl. 73—299)

The present invention relates to a liquid-level gauge which comprises a capsule diaphragm which is mounted in a cup-shaped housing and acts by means of a lever or the like and further transmitting means upon an indicating device and is, in turn, acted upon at its exterior by the atmospheric pressure or the pressure within a closed chamber, while its interior is connected to an immersion tube extending to the bottom of a liquid container and is acted upon, through this tube and the air cushion therein, by the hydrostatic pressure which depends upon the level of the liquid in the container.

The liquid-level gauges of the above-mentioned type were previously of such a construction that for adjusting them to their zero position it was necessary to shift either their entire transmitting means or at least the bearing means or fulcrum of the lever in the direction of movement of the diaphragm. This has the disadvantage that it also causes the angular position of the transmitting lever to be changed and that, therefore, every adjustment of the zero position of the gauge not only requires an adjustment of the bearing means of this lever but also a new adjustment of the transmission ratio or moment-arm lengths of the lever.

It is an object of the present invention to provide a liquid-level gauge of the type described which overcomes these disadvantages of the previous gauges so as to permit the bearing means of the transmitting lever to be adjusted independently of any variation of the transmission ratio of this lever.

For attaining this object, the invention provides that the bearing means supporting the lever are secured to an arm which is connected at one end to an intermediate supporting plate and is resiliently movable in a direction transverse or perpendicular to the direction of movement of the diaphragm. The position of this arm and thus also of the bearing means may then be easily adjusted by a setscrew which acts upon the free end of the arm. A micrometric action of this setscrew upon the arm may be attained, for example, by mounting it in a tapped bore in the side wall of the housing so that its axis extends at an oblique angle to the arm which carries the bearing means. The setscrew is thus very easily accessible so as to permit a zero adjustment of the gauge to be carried out at the end of its manufacture and assembly or whenever such an adjustment may subsequently become necessary.

Another advantageous feature of the invention, for supporting the transmitting lever very securely and in a manner so as to facilitate the adjustment of the gauge, consists in mounting the shaft of the two-armed lever within an elastic spring bracket so as to be movable to a limited extent in its longitudinal direction. Near their free outer ends the two arms of this spring bracket are then provided with small coaxial bores serving as bearings through which the pin-shaped trunnion ends of the shaft of the lever are inserted. The outer ends of the arms beyond these bores are preferably U-shaped by being bent over toward the outside and backwards so that the free arms of these U-shaped end portions of the spring bracket will bear resiliently upon the outer ends of the pin-shaped trunnions and thereby prevent the shaft from shifting in its longitudinal direction. Moreover, the outer ends of these pin-shaped trunnions are preferably pointed so as to engage practically without friction upon the flat surfaces of the bent-over end portions of the spring bracket. If the spring bracket is very elastic by being made of very thin sheet metal, it may be braced by an element which limits the swinging movements of its two arms and may consist, for example, of a rigid spacing bracket which is inserted between the two arms of the spring bracket. In order to prevent the pin-shaped trunnions on the shaft of the lever from slipping out of the elastic spring bracket as the result of hard impacts which might be exerted upon the gauge, for example during careless transportation thereof, the invention further provides that the two arms of the spacing bracket between those of the spring bracket may be bent outwardly of the plane of the spring bracket and that their ends may be bent over so as to be U-shaped and to extend around the two bent-over ends of the arms of the spring bracket, thereby serving as abutments to limit any swinging movements of each of these spring arms also in the outward direction.

In order to avoid the necessity of assembling the gauge by installing each of its different components individually with great effort and at a high cost of labor in the cup-shaped housing through the open side thereof, the present invention further provides that all of the transmitting elements which are to be located between the diaphragm and the dial of the gauge may be mounted on or connected to a separate plate so as to form a structural unit which may then be easily inserted into the housing and secured therein at a predetermined distance from the diaphragm, for example, on suitable projections, ribs or the like which may form integral parts of the inner walls of the housing.

The mentioned lever for transmitting the movements of the diaphragm to the indicating means may be provided, for example, in the form of a two-armed lever which is pivotable about an axis which extends at right angles to the central axis of the capsule diaphragm. One arm of this lever engages upon the capsule diaphragm, while its other arm acts through a chain or like flexible member and against the tension of a spring upon a shaft which carries the pointer of the gauge. In order to permit the transmission ratio of this lever to be adjusted in accordance with the size of the movements of the diaphragm, the arm of the lever which is acted upon by the diaphragm is preferably provided in the form of a setscrew which may be threaded into the shaft of the lever so as to permit the distance to be changed between the axis of this shaft and the part of the screw head which engages upon the diaphragm. Such adjustments may be easily carried out without requiring the gauge housing to be opened by providing the side wall of the housing at a point opposite to the head of the mentioned setscrew with an aperture which may be closed, for example, by a plug, grub screw, or like removable member and through which, after the plug or the like has been removed, the shank of a screw driver may be inserted into the housing for turning the setscrew so as to adjust the transmission ratio of the lever. In order to reduce the friction of the connection between the free end of the other arm of the lever and the end of the chain or the like which is wound around the pointer shaft and also to reduce the cost of the manufacture of the gauge and to facilitate its assembly, this connection is preferably provided in the form of a knife-edge bearing which consists of a thin link on the end of the chain which is hooked over the end of the lever arm into a V-shaped notch.

For protecting the capsule diaphragm from being damaged and for simplifying its installation in the gauge housing, it is preferably provided with a threaded tubular connection fitting which is screwed into a bore in the bottom wall of the housing and may be connected by a pipe or hose line to the immersion tube which extends to the bottom of the liquid container. It is further of advantage to provide the gauge housing with another connection fitting which preferably forms an integral part of the side or bottom wall of the housing and may lead either directly to the outer atmosphere or may be connected by another pipe or hose line to the atmosphere or to the inside of a closed chamber (neutral atmosphere), for example the container holding the liquid to be measured.

For properly sealing the inside of the gauge housing against the entry of dirt as well as external pressure influences, a highly preferred construction of the new gauge is provided with a flat sealing ring which is interposed between the upper rim of the housing and the glass cover plate of the gauge. This sealing ring which also secures an inner masking ring to the rim of the gauge housing is held in its proper position between the rim and the glass plate by a locking ring which is clamped tightly around the rim of the housing and the edge of the glass plate and thus seals the upper end of the housing tightly toward the outside.

If the gauge according to the invention is to be further provided with a lamp for illuminating the dial, the dial disk is made of a translucent material and underneath this disk the wall of the housing is provided with an aperture through which a lamp socket may be easily inserted from the outside into the housing and be secured therein in a manner so as to be easily removed when the light bulb in the socket is burned out and has to be exchanged. For sealing this aperture in the wall of the housing, a sealing ring is applied on the inner rim surrounding the aperture and a cap of a transparent material which covers the light bulb is clamped thereon, preferably by providing the inner rim of the aperture with a thin projection which, after the cap has been applied over the aperture, is bent inwardly over an annular flange on the lower end of the cap.

The various features and advantages of the present invention will become more clearly apparent from the following detailed description thereof which is to be read with reference to the accompanying drawing, in which:

FIGURE 1 shows a cross section of the gauge according to the invention which is taken along the line 1—1 of FIGURE 3;

FIGURE 2 shows an enlarged detail view of a part of FIGURE 1;

FIGURE 3 shows a top view of the gauge without its cover, pointer, and dial disk; while FIGURE 4 shows a cross section which is taken along the broken line 4—4 of FIGURE 2.

Figure 3:
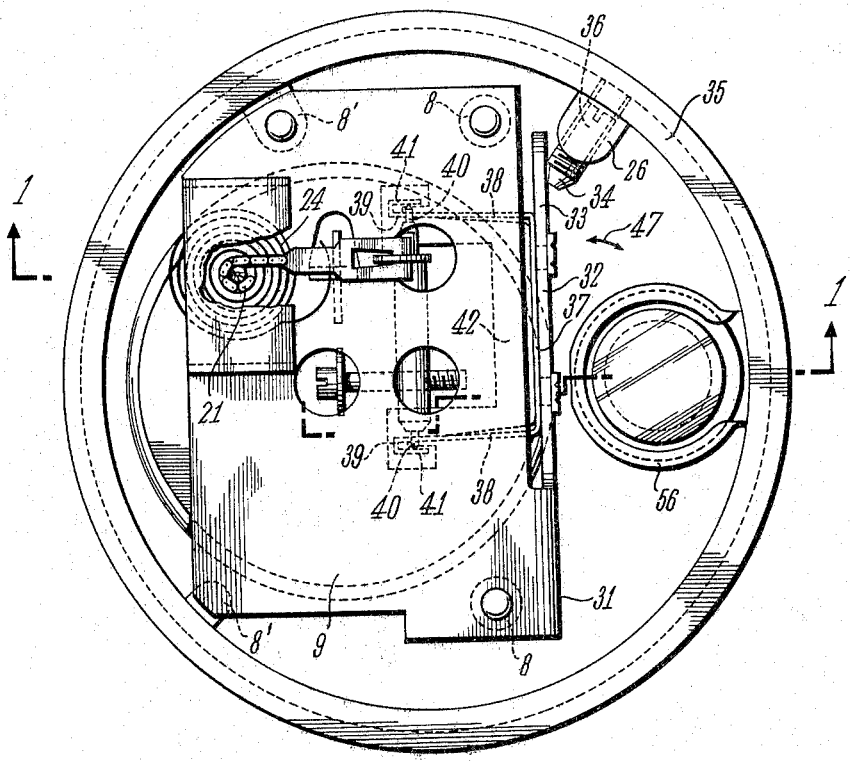

As illustrated particularly in FIGURE 1 of the drawing, the gauge according to the invention comprises a cup-shaped housing 1 which is open at its upper end, while its bottom 2 carries integrally thereon a connection fitting 3 which may either communicate directly with the outer atmosphere or be connected by a hose line with the atmosphere or with the inside of a closed container, for example, the container of the liquid the level of which is to be measured by the gauge. The bottom 2 of the housing 1 is further provided with a tapped bore 4 through which another connection fitting 6 which is secured at its upper end to a capsule diaphragm 7, may be inserted from the inside of the housing 1 and screwed into the bore 4 by a screw thread 5. This connection fitting 6 may be connected, for example by a hose line, to an immersion tube which extends into and to the bottom of the container, not shown, holding the liquid the level of which is to be measured.

Above the capsule diaphragm 7, the gauge housing 1 contains an intermediate supporting plate 9 which is mounted on studs 8' and ribs 8 on the bottom and side wall of the housing and supports the different transmitting elements as subsequently described. These transmitting elements comprise a two-armed lever 10 which is pivotable about the axis of a shaft 13; the latter extends at right angles to the central (vertical) axis of the capsule diaphragm 7. One arm 11 of this lever 10 is formed by a setscrew, the shank 12 of which is threaded into a tapped bore in the lever shaft 13. The head 14 of this screw has a collar 15 which is adapted to bear upon the upper surface 16 of the capsule diaphragm 7. The other arm 17 of lever 10 passes through an aperture in the end of a thin connecting link 20 of a chain 21. The sharp edge of this aperture engages with the apex of a notch 19 at the upper end of arm 17 and thus forms a knife-edge bearing between the upper end of the lever arm 17 and the chain 21. The other end of this chain 21 is secured to a shaft 23 which carries on its upper end a pointer 22 and is rotatably mounted at its lower end in a bearing 23' on the supporting plate 9, a further journal is provided for the shaft 23 near its upper end in the central web of an inverted U-shaped bracket 25 which is secured to the supporting plate 9. Shaft 23 is acted upon by a spiral spring 24 which extends spirally around the shaft and the inner end of which is secured to the shaft, while its outer end is secured to a projection on plate 9. This spring 24 tends to turn the shaft in one direction so as to wind the chain 21 around it and to maintain thereby the collar 15 on the screw arm 11 in yieldable engagement with the upper surface 16 of the diaphragm 7. Underneath the pointer 22, a dial disk 27 is secured to the upper side of the central web of bracket 25 and to suitable ribs or the like 26 on the wall of housing 1, only one of which is shown in FIGURES 1 and 3. This dial disk 27 has an aperture 28 through which the shaft 23 extends, and on its upper surface 29 it is provided with scale graduations, not shown, on which the particular level of the liquid in the container may be read in accordance with the deflection of the pointer 22. The upper end of housing 1 is closed by a glass viewing plate 30.

As may be seen particularly in FIGURE 3, the downwardly bent side 31 of the supporting plate 9 is partly severed by a cut from the horizontal part thereof so as to form a resilient arm 32 which extends longitudinally at right angles to the axis of the capsule diaphragm 7; this arm 32 also extends transversely in a plane parallel to this axis. The free end 33 of this arm 32 bears against the conical end 34 of a setscrew 36 which is threaded into the side wall 35 of the housing 1 in such position that its axis is obliquely inclined to the arm 32.

On its inner side this arm 32 carries a U-shaped bracket 37 of thin spring metal. The two arms 38 of this spring bracket 37 are provided near their outer ends 39 with coaxial bores in which the pin-shaped trunnions 40 of the lever shaft 13 are rotatably mounted. By being bent over backwards, the outer ends 39 of these arms 38 are U-shaped and the free ends of these U-shaped parts bear under the inward bias of the arms 38, with a slight pressure upon the pointed ends of the trunnion pins 40 so that the shaft 13 is prevented from moving in its axial direction. However, its rotary movement, entails practically no friction.

In order to prevent the very thin elastic arms 38 of the spring bracket 37 from being bent, for example, as the result of strong shocks, they are braced by a rigid spacing bracket 42 which is inserted between them This spacing bracket 42 and thereby also the spring bracket 37 are secured to the arm 32 by small projections 43 (FIG. 2) which extend through apertures in the arm 32 and are riveted to the outer side thereof. As illustrated particularly in FIGURES 2 and 4, the arms 44 of the spacing bracket 42 which brace the two arms 38 of the spring bracket 37 are bent upwardly so that their ends 45 project above the ends 39 of the arms of the spring bracket and are likewise bent over outwardly so as to be U-shaped. The downwardly inclined outer arm 46 of each of these U-shaped ends has such a length that its outer edge 46a (FIG. 4) projects toward the right beyond the inclined edge 38a of the spring arm 38 and thus serves as an abutment which limits the extent of any swinging movements of the associated spring arm 38 in the outward direction. Due to this limitation of the movements of the ends 39 of the spring arms 38 there is no possibility that the trunnion pins 40 on the shaft 13 might jump out of their bearing bores in the spring arms 38 when the entire gauge, or at least the preassembled transmission unit thereof consisting of the main parts 9 to 21 and 23 to 25, is subjected to severe shocks; in such an event the spring arm 38 would hit against the surface 46b of the rigid end 46 of the associated arm 44 of the spacing bracket 42.

For adjusting the pointer 22 of the gauge to the zero position on the dial 29, it is merely necessary to turn the setscrew 36 in one direction or the other. The biased arm 32 and the two brackets 37 and 42 thereon will then be pivoted in one sense or the other in the direction of the arrow 47. Since this movement occurs only in a direction parallel to the surface 16 of the capsule diaphragm 7 and therefore perpendicularly to the expansion and contraction of the latter, it will not affect the transmission ratio of the lever 10 which may be adjusted by turning the screw-shaped arm 11 of this lever, whereby the effective length of this arm is changed. In order to permit such an adjustment, the side wall 35 of the housing 1 is provided at a point opposite to the screw head 14 with an aperture 48 which is normally closed by a plug 49. After this plug 49 has been removed, the shank of a screw driver may be inserted through the aperture 48 and into the screwhead 14 which may then be turned so as to change the effective length of the arm 11.

If the indications of the pointer 22 are to be read on the dial in poor light, the dial disk 29 is made of a translucent material. At the side of the housing 1 opposite the aperture 48 and laterally of the diaphragm 7, the bottom 2 of the housing may be provided with a cylindrical part 50 (FIG. 1) into which a small light socket 52 with an electric bulb 55 may be easily inserted in the direction of the arrow 51. By a simple locking device, e.g. the spring clip 52', this light socket 52 may be locked in the cylindrical part 50 so as to permit it to be easily removed when the electric bulb 55 is burned out and has to be exchanged. The upper rim 53 of the cylindrical part 50 carries a transparent cap 54 which covers the light bulb 55 toward the inside of the housing 1. In order to secure this cap tightly to the rim 53, the latter has a thin extension 56 which, after the cap 54 has been applied from above upon a sealing ring 57 on the rim 53, is beaded over a flange 58 on the cap 54.

Finally, on the upper rim 59 of the housing 1 a flat sealing ring 60 is provided which also holds a masking ring 61 and, in turn, is covered by the glass plate 30. This glass plate 30 is secured to the rim 59 of the housing by a locking ring 62 of U-shaped cross section which is clamped tightly around the flange on the rim 59, the sealing ring 57, and the outer edge of the glass plate 30 and thus tightly closes the upper end of the housing.

Although our invention has been illustrated and described with reference to a preferred embodiment thereof, we wish to have it understood that it is in no way limited to the details of such embodiment but is capable of numerous modifications within the scope of the appended claims.

Having thus fully disclosed our invention, what we claim is:

1. A liquid-level gauge comprising a housing; a capsule diaphragm secured within said housing; a tubular member connected to said diaphragm and extending through a wall of said housing and adapted to connect the inside of said diaphragm to an immersion tube extending into a container holding a liquid the level of which is to be measured; indicating means in said housing; and transmitting means within said housing for transmitting the movements of said diaphragm to said indicating means, said transmitting means comprising a lever acted upon by said diaphragm, bearing means for pivotably mounting said lever, first adjusting means for adjusting the position of said bearing means within said housing, second adjusting means for adjusting the transmission ratio of said lever independently of said first adjusting means, and a supporting plate secured within siad housing and having an arm connected thereto at one end and resiliently pivotable about said one end in a direction at right angles to the direction of movement of said diaphragm, said first adjusting means comprising a setscrew adapted to bear upon said arm near the free end thereof for pivoting said arm and thus said bearing means and the pivot axis of said lever to different positions.

2. A liquid-level gauge as defined in claim 1, wherein said setscrew is threaded into a tapped bore provided in a wall of said housing to as to be adjustable from the outside of said housing, the longitudinal axis of said setscrew being obliquely inclined to the longitudinal direction of said arm.

3. A liquid-level gauge comprising a housing; a capsule diaphragm secured within said housing; a tubular member connected to said diaphragm and extending through a wall of said housing and adapted to connect the inside of said diaphragm to an immersion tube extending into a container holding a liquid the level of which is to be measured; indicating means in said housing; and transmitting means within said housing for transmitting the movements of said diaphragm to said indicating means, said transmitting means comprising a lever acted upon by said diaphragm, bearing means for pivotally mounting said lever, first adjusting means for adjusting the position of said bearing means within said housing and second adjusting means for adjusting the transmission ratio of said lever independently of said first adjusting means, a supporting plate secured within said housing and having an arm connected thereto at one end and resiliently pivotable about said one end in a direction at right angles to the direction of movement of said diaphragm, said first adjusting means comprising a setscrew adapted to bear upon said arm near the free end thereof for pivoting said arm and thus said bearing means and the pivot axis of said lever to different positions, said lever comprising a shaft rotatably mounted on said bearing means and extending at a right angle to the central axis of said capsule diaphragm, and two arms projecting radially from said shaft at an angle to each other, said transmitting means further comprising a shaft rotatably mounted within said housing and having a pointer on one end thereof, a spring acting upon said shaft and tending to turn said shaft in one direction toward and beyond the zero position of said pointer, a flexible member connected at one end to the free end of the first of said lever arms and at the other end to said pointer shaft and adapted to be wound on and off said pointer shaft when said lever is being pivoted, the free end of the second of said lever arms resiliently engaging upon said diaphragm under the action of said spring transmitted to said second lower arm through said pointer shaft, said flexible member, said first lever arm, and said lever shaft, said gauge further comprising means connecting said first lever arm and said flexible member to each other and forming a knife-edge bearing.

4. A liquid-level gauge comprising a housing; a capsule diaphragm secured within said housing; a tubular member connected to said diaphragm and extending through a wall of said housing and adapted to connect the inside of said diaphragm to an immersion tube extending into a container holding a liquid the level of which is to be measured; indicating means in said housing; and transmitting means within said housing for transmitting the movements of said diaphragm to said indicating means, said transmitting means comprising a lever acted upon by said diaphragm, bearing means for pivotably mounting said lever, first adjusting means for adjusting the position of said bearing means within said housing, second adjusting means for adjusting the transmission ratio of said lever independently of said first adjusting means, and a supporting plate secured within said housing and having an arm connected thereto at one end and resiliently pivotable about said one end in a direction at right angles to the direction of movement of said diaphragm, said first adjusting means comprising a setscrew adapted to bear upon said arm near the free end thereof for pivoting said arm and thus said bearing means and the pivot axis of said lever to different positions, said lever being rigidly secured to a shaft, said bearing means comprising a substantially U-shaped spring bracket having a central web secured to said arm of said supporting plate and a pair of spring arms projecting toward one side of said central web and being resiliently movable in a common plane, the ends of said shaft being pivotably mounted on said spring arms near the free ends thereof whereby said shaft is resiliently movable in its longitudinal direction.

5. A liquid-level gauge as defined in claim 4, further comprising means for limiting the extent of the longitudinal movement of said shaft.

6. A liquid-level gauge as defined in claim 4, wherein the free ends of said spring arms are bent over in opposite directions so that each of them forms a substantially U-shaped part, said shaft having pointed pin-shaped ends, the inner webs of said U-shaped parts having coaxial bores serving as bearings, said pin-shaped ends extending through said bores, the outer webs of said U-shaped parts engaging resiliently upon said pointed ends and limiting the longitudinal movements of said shaft.

7. A liquid-level gauge as defined in claim 4, further comprising means for limiting the extent of the resilient movements of said spring arms in at least one direction.

8. A liquid-level gauge as defined in claim 6, further comprising a substantially U-shaped rigid spacing bracket inserted between said spring arms for limiting the extent of the resilient movements of each of said spring arms in the direction toward the other spring arm, said rigid bracket having a central web secured together with the central web of said spring bracket to said arm of said supporting plate.

9. A liquid-level gauge as defined in claim 8, wherein said rigid bracket has a pair of arms each having an end portion extending around the end part of the associated spring arm from the inner to the outer side thereof but normally spaced from said outer side, whereby said end portions of both rigid bracket arms limit the extent of the resilient movements of said spring arms in opposite outward directions and thereby prevent said pin-shaped ends of said shaft from slipping out of said bearing bores in said spring arms.

10. A liquid-level gauge comprising a housing: a capsule diaphragm secured within said housing; a tubular member connected to said diaphragm and extending through a wall of said housing and adapted to connect the inside of said diaphragm to an immersion tube extending into a container holding a liquid the level of which is to be measured; indicating means in said housing; and transmitting means within said housing for transmitting the movements of said diaphragm to said indicating means, said transmitting means comprising a lever acted upon by said diaphragm, bearing means for pivotably mounting said lever, first adjusting means for adjusting the position of said bearing means within said housing, second adjusting means for adjusting the transmission ratio of said lever independently of said first adjusting means, and a supporting plate secured within said housing and having an arm connected thereto at one end and resiliently pivotable about said one end in a direction at right angles to the direction of movement of said diaphragm, said first adjusting means comprising a setscrew adapted to bear upon said arm near the free end thereof for pivoting said arm and thus said bearing means and the pivot axis of said lever to different positions, said supporting plate being secured in said housing at a predetermined distance from said diaphragm, all of said transmitting means being supported by said supporting plate, said gauge further comprising a shaft rotatably mounted on said supporting plate and having a pointer on one end thereof, and means connecting said lever to said shaft and adapted to convert the pivoting movement of said lever into rotary movement of said shaft.

11. A liquid-level gauge comprising a housing; a capsule diaphragm secured within said housing; a tubular member connected to a diaphragm and extending through a wall of said housing and adapted to connect the inside of said diaphragm to an immersion tube extending into a container holding a liquid the level of which is to be measured; indicating means in said housing; and transmitting means within said housing for transmitting the movements of said diaphragm to said indicating means, said transmitting means comprising a lever acted upon by said diaphragm, bearing means for pivotably mounting said lever, first adjusting means for adjusting the position of said bearing means within said housing, and second adjusting means for adjusting the transmission ratio of said lever independently of said first adjusting means, said indicating means comprising an at least partly translucent dial disk within said housing, and a pointer adapted to sweep over said dial disk, a wall of said housing having an opening with a tubular part surrounding said opening, a lamp socket removably inserted into said tubular part from the outside of said housing, a light bulb in said socket, releasable means for locking said lamp socket in said tubular part, a sealing ring on the inner end surface of said tubular part, a transparent cap on said sealing ring and covering said light bulb, and securing means for tightly affixing said cap to said tubular part, said transparent cap having an outwardly projecting annular flange on its end engaging with said sealing ring, said securing means consisting of a thin substantially tubular extension on said tubular part extending beyond and encompassing said inner end surface, said sealing ring, and said flange, the free end of said tubular extension being bent inwardly over said flange so as to press said flange tightly on said sealing ring.

12. A liquid-level gauge comprising housing means forming an enclosure; capsule-diaphragm means within said closure for communication with a source of hydrostatic pressure; indicating means on said housing means movable for providing a measurement proportional to the expansion of said capsule-diaphragm means; motion-transmitting means within said enclosure for converting an expansion of said capsule-diaphragm means into a movement of said indicating means, said motion-transmitting means including support means mounted in said enclosure, a double-arm lever pivotably mounted upon said support means and having a pair of arms, one of said arms bearing upon said capsule-diaphragm means, and flexible link means coupling the other of said arms with said indicating means; and adjusting means on said housing means for shifting said support means to adjust an initial position of said indicating means independently of any modification of the moment-arm ratio of said lever.

References Cited by the Examiner

UNITED STATES PATENTS

| | | | |
|---|---|---|---|
| 1,064,555 | 6/1913 | Simmance et al. | 73—410 |
| 1,656,262 | 1/1928 | Batchelder | 73—502 X |
| 1,661,995 | 3/1928 | Brown | 73—299 |
| 1,804,695 | 5/1931 | Knobloch | 73—299 |
| 2,260,766 | 10/1941 | Bjong | 73—410 |
| 2,489,422 | 11/1949 | Kuhn | 74—522 |
| 2,558,742 | 7/1951 | Ford | 73—431 X |
| 2,560,237 | 7/1951 | Miller | 73—410 |
| 2,612,044 | 9/1952 | De Mart | 73—299 |

DAVID SCHONBERG, *Primary Examiner.*

F. H. THOMSON, *Examiner.*